Nov. 5, 1935.  J. H. MEAGHER  2,020,075

COMBINATION TEMPERATURE AND PRESSURE RELIEF VALVE

Original Filed April 12, 1933

INVENTOR.
James H. Meagher
BY
ATTORNEY.

Patented Nov. 5, 1935

2,020,075

UNITED STATES PATENT OFFICE 2,020,075

COMBINATION TEMPERATURE AND PRESSURE RELIEF VALVE

James H. Meagher, Springfield, Mass., assignor to The Chapman Valve Manufacturing Company, Indian Orchard, Mass., a corporation of Massachusetts Application April 12, 1933, Serial No. 665,811
Renewed April 23, 1935

2 Claims. (Cl. 277—60)

This invention relates to improvements in relief or vent valve apparatus and this application is a continuation in part of an application Serial No. 622,632 filed by me on July 15, 1932.

The principal objects of the invention are directed to the provision of a valve which is operable under the influence of excessive heat and/or pressure to open and vent a system with which the valve is used. As novel features the valve includes a quill for projecting into a tank or the like to which the valve may be secured, means for guiding a temperature responsive element in its elongating movements, and supplemental means sensitive to the influence of heat for opening a port for venting purposes.

Figure 1:
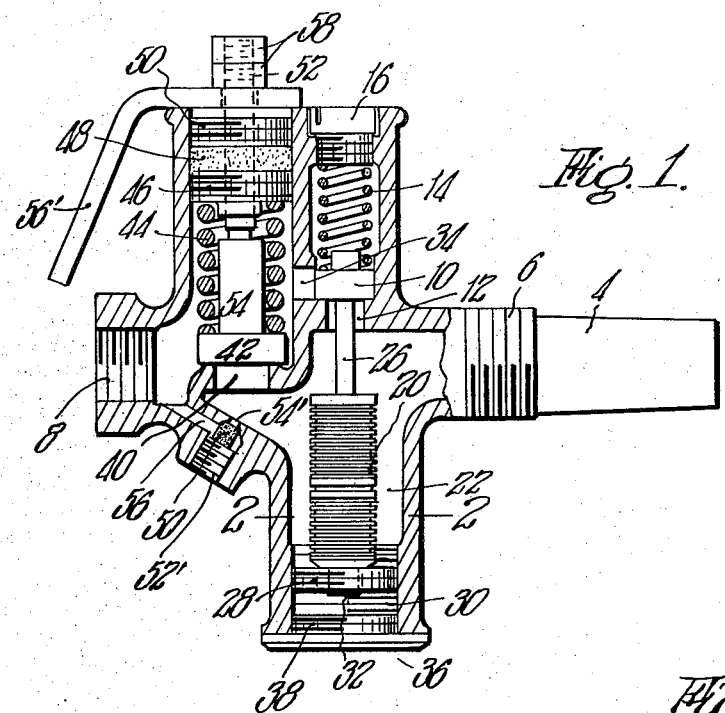
Figure 2:
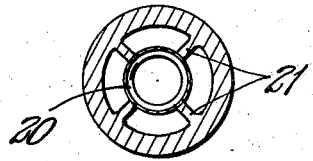

Various novel features and advantages of the invention will be more fully hereinafter referred to in connection with the accompanying description of the invention in its preferred form reference being made to the accompanying drawing, wherein:

Fig. 1 is a partial side elevational and sectional view of a valve embodying the novel features of the invention, and Fig. 2 is a sectional plan view on the line 2—2 of Fig. 1.

Referring to the drawing more in detail the invention will now be fully described.

The valve of the invention includes a body 2 having a hollow quill-like extension 4 at one side, adjacent a threaded portion 6, which may be called the inlet side of the valve, and a threaded opening 8 at its other side, which may be called the outlet.

The quill 4 is desirable to obviate corrosion and consequent stoppage at the inlet side of the valve. Ordinarily where a fitting or valve is screwed into a tank, such as a steel tank, the tank adjacent the opening corrodes so that the corrosion tends to stop the opening into the valve. By providing the quill the end of the opening into the valve is beyond the point of corrosion.

When it is desired to vent a system such as a hot water supply system, the threaded portion of the valve may be screwed into a tank or the like of the system so that the quill extends inwardly into the tank and the outlet may receive a pipe connection so that water passing through the valve may be conducted to waste.

A temperature valve 10 is arranged to move up and down and towards and away from a seat provided at the upper side of a temperature port 12. A spring 14 is disposed between the upper side of the valve 10 and the lower side of a cap 16 which is in screw threaded engagement with the body so that it may be moved in and out to vary the tension on the spring.

A thermostat 20 is disposed within a lower bore 22 of the valve and this is preferably of the sylphon type. A sylphon is adapted to elongate and contract accordingly as the temperature varies. The sylphon in this case is arranged so that its upper end may abut a stem 26 associated with the valve 10. An adjusting plug 28 in screw threaded engagement with the bore 30 of the valve is bored out to receive a pilot 32 at the lower end of the sylphon.

The plug 28 may be moved up and down to control the operation of the sylphon and may be set so that the sylphon will elongate sufficiently at a certain predetermined temperature to act on the stem and open the valve 10.

With the valve connected to a hot water system or the tank thereof, the sylphon may operate to open the valve 10 when the temperature in the system reaches a predetermined point and in that way the system is vented. When the sylphon operates to open the valve, water flows through the port 12, past the valve 10 and through an intermediate port 34 at the discharge side of the port 12. A cap 36 has a screw threaded portion 38 for closing up the lower end of the valve.

A pressure port 40 is provided which is normally closed by a pressure valve 42 thereover. A spring 44 is disposed between the upper side of the valve 42 and a screw threaded adjusting member 46. This member 46 operates in threads provided in the valve body so that the spring may be tensioned and the resistance thereof varied so that pressure against the lower side of the valve will operate to open the valve under various degrees of resistance. In this way the valve may be set to open under various pressures as may be desired.

A packing 48 is provided above the member 46 and a screw threaded member 50 also in screw threaded engagement with the body exerts pressure on the packing to seal a stem 52 which is suitably connected to a shank 54 of the valve.

A lever 56' at the upper side of the valve loosely receives the stem 52 and nuts 58 on the upper side of the stem are provided so that the lever may be tilted to act on the nuts and pull the stem 52 upwardly so that the valve 42 may be moved away from its seat. Thus the valve 42 which is ordinarily responsive to pressure may be operated at any time to vent the system.

With the valve connected to a system or to a hot water tank should the pressure reach a predetermined point, the valve 42 will automatically open so that the system is thereby vented.

As a special feature of the invention, it is desired that the sylphon or thermostat 20 be guided to obviate the possibility of buckling, as for instance when it elongates to operate the valve 10 against the resistance of the spring 14. To this end a plurality of guides 21 shown in Fig. 2 are spaced around the sylphon to support it on opposite sides but yet allow it to move relative thereto or elongate. Any buckling tendency of the sylphon seriously affects the accuracy of operation, hence it is quite necessary that the valve operate at the desired temperature.

A fusible member 50 is provided which may be of fusible metal adapted to melt at a certain temperature. As shown this plug 50 is held in place by a screw 52' so that it abuts a suitable seat on the outlet side of a port 54' so as to cut off communication with a discharge port 56 adjacent thereto. If for any reason the sylphon fails to operate at a certain temperature the plug may be melted at that or a relatively higher temperature and allow the venting of the valve through the ports 54' and 56 into the discharge outlet side.

It will be observed that not only is the valve constructed with a quill so that its inlet is beyond its connecting part to obviate corrosion but the temperature responsive element is guided in its elongating movements and other means is provided to vent the valve which is adapted to operate independently of the first mentioned responsive element.

Having described the invention in the form at present preferred what I desire to claim and secure by Letters Patent of the United States is:

1. A relief valve of the class described comprising in combination, a body having inlet and outlet openings, ports in said body between said openings, a bore in said body below one of said ports, a valve normally closing said one port having a stem extending downwardly into said bore, a temperature-responsive element associated with said stem adapted to elongate to move said stem upwardly to open said valve, means within said body for guiding said element as it elongates, a second bore in said body above another of said ports, a valve normally closing said other port having a stem extending upwardly into said second bore, said last-named valve being spring-pressed and operable by pressure in said body and said inlet and outlet openings leading into said bores, all adapted and arranged whereby the opening of one of said valves brings about communication between said bores and said inlet and outlet openings, and a fusible plug normally closing another of said ports adapted to melt at an excessive temperature and open a passageway between said inlet and outlet openings.

2. A relief valve of the class described comprising in combination, a body having inlet and outlet openings, ports in said body between said openings, a cap in screw-threaded engagement with said body, a bore in said body below one of said ports, a valve normally closing said one port having a stem extending downwardly into said bore, a spring in said body between said valve and said cap for urging said valve downwardly, a sylphon associated with said stem adapted to elongate to move said stem upwardly to open said valve, means within said bore beneath said sylphon for adjusting said sylphon relative to said port, spaced guiding means within said body for guiding said sylphon as it elongates, a second bore in said body above another of said ports, a pressure valve normally closing said other port having a stem extending upwardly into said second bore, a spring around said stem for urging said valve into port-closing position and an adjusting member screw-threaded in said second bore for adjusting the tension of said spring against said valve.

JAMES H. MEAGHER.